United States Patent
Shim

(10) Patent No.: US 6,839,743 B2
(45) Date of Patent: Jan. 4, 2005

(54) WEB DRIVE SYSTEM

(75) Inventor: Jae-Bum Shim, Seoul (KR)

(73) Assignee: Logic Plant Co., Ltd., Seoul (KR)

( * ) Notice: Subject to any disclaimer, the term of this patent is extended or adjusted under 35 U.S.C. 154(b) by 841 days.

(21) Appl. No.: 09/797,284

(22) Filed: Mar. 1, 2001

(65) Prior Publication Data

US 2001/0051993 A1 Dec. 13, 2001

(30) Foreign Application Priority Data

Mar. 2, 2000 (KR) ......................................... 2000-10478

(51) Int. Cl.[7] ............................................. G06F 15/16
(52) U.S. Cl. ...................... 709/217; 709/216; 709/248; 711/112; 711/114; 711/148; 711/170; 711/172; 711/203
(58) Field of Search ................................ 709/217, 219, 709/248; 711/170, 172, 148, 112, 114, 203

(56) References Cited

U.S. PATENT DOCUMENTS

| | | | | |
|---|---|---|---|---|
| 5,926,834 A | * | 7/1999 | Carlson et al. | ............. 711/152 |
| 6,073,209 A | * | 6/2000 | Bergsten | ...................... 711/114 |
| 6,304,881 B1 | * | 10/2001 | Halim et al. | ................. 707/201 |
| 6,351,776 B1 | * | 2/2002 | O'Brien et al. | ............. 709/245 |
| 6,449,688 B1 | * | 9/2002 | Peters et al. | ................. 711/112 |
| 6,735,623 B1 | * | 5/2004 | Prust | .......................... 709/219 |
| 6,745,207 B2 | * | 6/2004 | Reuter et al. | ................ 707/200 |
| 6,745,303 B2 | * | 6/2004 | Watanabe | .................... 711/161 |
| 2002/0095547 A1 | * | 7/2002 | Watanabe et al. | ........... 711/114 |

\* cited by examiner

Primary Examiner—Hosain Alam
Assistant Examiner—Shawki Ismail
(74) Attorney, Agent, or Firm—Baker Botts LLP

(57) ABSTRACT

A web drive system that integrates storage spaces provided by multiple Internet sites into a single imaginary drive usable as a storage of a mobile terminal. The web drive system includes: a web drive interface for connecting a mobile terminal controller to an imaginary drive to form a web drive; a user information manager for managing user information necessary to have access to the individual Internet sites; a user information storage for storing the user information; an Internet site interface for automatically logging onto the individual Internet sites; a storage space integration manager for managing the information data to be stored/restored; a space allocation information storage for storing space allocation information indicating the capacity of the storage space of the web drive and the location of the Internet site that stores the information data; and a storage mode selector for selecting the mode of storing the information data.

7 Claims, 4 Drawing Sheets

WEB DRIVE SYSTEM

BACKGROUND OF THE INVENTION (a) Field of the Invention

The present invention relates to a web drive system. More specifically, the present invention relates to a web drive system that integrates storage spaces provided by multiple Internet sites into a single imaginary drive usable as a storage of a mobile terminal, like a hard disk.

(b) Description of the Related Art

With a rapid spread of the Internet and hence a great increase in the number of Internet users, Internet services have been expanded to various fields including shopping, data search, network games, chat services, etc. The number of Internet sites that provide a variety of services has also rapidly increased, and the individual Internet sites have extended their services to process and convert information as well as provide information.

In particular, some Internet sites provide not only information but also storage spaces for users to store various information data such as working files or private files.

The storage spaces supplied by the Internet sites are small in capacity and insufficient to store large amounts of information data, so the user has to be registered in multiple Internet sites providing storage sites in order to secure a large capacity of storage space in the web space. However, the user has to connect to the individual Internet sites separately in order to use the storage spaces supplied by the individual Internet sites and have knowledge of the Internet sites that have storage spaces storing the information data to be used in order to use the information data stored in the corresponding storage spaces. That is, when the user cannot locate the storage spaces of the Internet sites that store desired information data, he/she has to connect to the Individual Internet sites concerned and separately check whether the desired information data are stored in the storage spaces of the particular Internet sites. Furthermore, the user also has to take the trouble to separately connect to the corresponding Internet sites and check the capacities of the storage spaces available.

SUMMARY OF THE INVENTION

It is an object of the present invention to solve the problem with the prior art and to provide a web drive system that integrates storage spaces of small capacity provided by multiple Internet sites into a large storage space usable in an undivided form.

To achieve the above object of the present invention, in a mobile terminal which includes an input for receiving a user signal to operate the mobile terminal of a user, an output for displaying the operational status of the mobile terminal, a mobile terminal controller for controlling the entire operation of the mobile terminal based on the user signal, a drive for storing various information data, and an Internet interface for providing a physical connection between the mobile terminal and the Internet, a web drive system includes: a web drive interface for connecting the mobile terminal controller to an imaginary drive to form a web drive so that storage spaces provided by a plurality of Internet sites are integrated into a single drive; a user information manager for managing user information necessary to have access to the individual Internet sites; a user information storage for storing the user information; an Internet site interface for automatically logging onto the individual Internet sites based on the user information; a storage space integration manager for managing the information data to be stored/restored in/from the web drive; a space allocation information storage for storing space allocation information indicating the capacity of the storage space of the web drive and the location of the Internet site that stores the information data; and a storage mode selector for selecting the mode of storing the information data in the storage spaces of the individual Internet sites, and converting and restoring the information data based on the selected storage mode.

The storage space integration manager includes: a free storage space checker for checking a free space of the storage space provided by the individual Internet sites; a synchronizer for synchronizing a time difference between connection and data transmission to the individual Internet sites; and a converter for converting, dividing and integrating the information data so as to store/read the information data in/from the storage space of the individual Internet sites.

The storage space integration manager further includes a security manager for managing security for connection to the individual Internet sites.

In another aspect of the present invention, there is provided a web drive system including the steps of: providing a connection to an imaginary drive to form a web drive upon receiving a web drive connection signal for integrating storage spaces provided by multiple Internet sites into a single storage space; designating a mode of storing information data in the web drive and specific Internet sites that provide the storage spaces; storing user information for connection to the individual Internet sites, and initializing space allocation information of the storage spaces provided by the designated Internet sites; automatically logging onto the designated Internet sites based on the user information stored; and initializing the storage spaces provided by the individual Internet sites, and updating information about the web drive.

The web drive system further includes the steps of: checking the space allocation information of the storage spaces of the multiple Internet sites upon receiving an instruction signal for storing the information data in the web drive; converting and dividing the information data and determining whether the individual Internet sites are connected, so as to store the information data based on the space allocation information checked; storing the converted and divided information data in the storage spaces of the individual Internet sites based on the designated storage mode if the individual Internet sites are connected, or automatically logging onto the individual Internet sites based on the user information and then storing the information data in the storage spaces of the individual Internet sites based on the designated storage mode if the individual Internet sites are not connected; and updating information about the web drive as the space allocation information of the storage spaces of the individual Internet sites changes due to changes in the stored information data.

The web drive system further includes the steps of: checking the space allocation information of the storage spaces of the individual Internet sites to locate the Internet sites that store the information data, upon receiving an instruction signal for reading the divided information data from the web driver; determining whether the individual Internet sites are connected, and restoring the information data from the storage spaces of the individual Internet sites based on the designated storage mode if the individual Internet sites are connected, or automatically logging onto the individual Internet sites based on the user information and then restoring the information data from the storage spaces of the individual Internet sites based on the designated storage mode if the individual Internet sites are not connected; and converting and integrating the divided information data that is restored, and updating information about the web drive as the space allocation information of the storage spaces of the individual Internet sites changes due to the changes in restored information data.

Also, the web drive system further includes the step of synchronizing a time difference between connection and data transmission to the individual Internet sites in storing/restoring the information data in/from the web drive.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

In the following detailed description, only the preferred embodiment of the invention has been shown and described, simply by way of illustration of the best mode contemplated by the inventor(s) of carrying out the invention. As will be realized, the invention is capable of modification in various obvious respects, all without departing from the invention. Accordingly, the drawings and description are to be regarded as illustrative in nature, and not restrictive.

Figure 1:
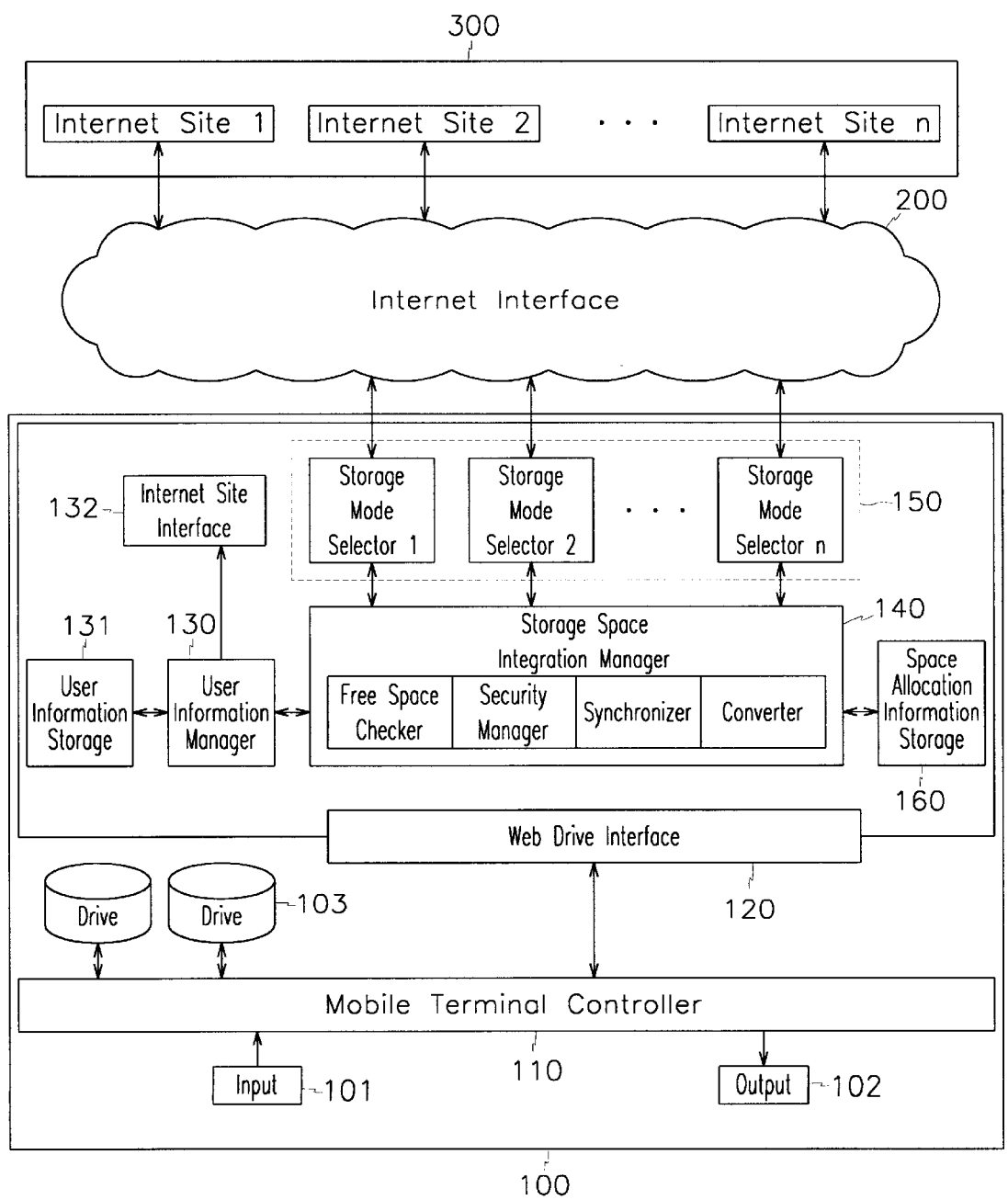
FIG. 1 is a schematic view of a web drive system according to an embodiment of the present invention.

FIG. 1 is a schematic view of a web drive system according to an embodiment of the present invention.

As shown in FIG. 1, the web drive system according to the embodiment of the present invention comprises an input 101, an output 102, a drive 103, a mobile terminal controller 110, an Internet interface 200, Internet sites 300, a web drive interface 120, a user information manager 130, a user information storage 131, an Internet site interface 132, a storage space integration manager 140, a storage mode selector 150, and a space allocation information storage 160.

The input 101 receives user signals for operating a mobile terminal 100 that supports Internet communications, such as a computer, PDA, cellular phone, etc., and the output 102 displays various information processed at the mobile terminal 100 and the operational status of the mobile terminal 100 processing the information.

The drive 103 stores various information data in a storage space, including hard disk and memory built into the mobile terminal 100, while the mobile terminal controller 110 controls the entire operation of the mobile terminal 100 based on the user signal received via the input 101, and the Internet interface 200 allows the mobile terminal 100 to have physical connection to the Internet.

The individual Internet sites 300 provide not only various information data but also a storage space of a given capacity so that the user can store the various information data in the storage space, and the web drive interface 120 interfaces the mobile terminal controller 110 with an imaginary drive so that the user integrates the storage spaces provided by the individual Internet sites 300 into a single imaginary drive.

The user information manager 130 manages user information including user ID and password necessary for the user to connect to the individual Internet sites 300. The user information storage 131 stores user information including user ID and password necessary for the user to connect to the individual Internet sites 300, and the Internet site interface 132 allows the user to automatically log onto the individual Internet sites 300 and register in the individual Internet sites 300 based on the output signal of the user information manager 130.

The storage space integration manager 140 comprises a free storage space checker for checking free space of the storage space provided by the individual Internet sites 300, a security manager for managing security for connection to the individual Internet sites 300, a synchronizer for synchronizing a time difference between connection and data transmission to the individual Internet sites 300, and a converter for converting, dividing and integrating the information data in order to store/restore the information data in/from the storage spaces of the individual Internet sites 300. The storage space integration manager 140 allows the storage spaces of a given capacity, each provided by the individual Internet sites 300, to be integrated into a single storage space in an undivided form so that the information data can be stored/restored in/from the single storage space.

The storage mode selector 150 sets a mode of storing the information data in the storage spaces of the individual Internet sites 300, i.e., single, copy, encode or compress mode, to convert and store the information data according to the designated mode, and to restore the stored information data according to the designated mode.

The space allocation information storage 160 stores space allocation information that indicates the capacity of the storage spaces of the individual Internet sites 300 and the Internet sites 300 storing the information data.

Now, a detailed description will be given as to the operations of the web drive system according to an embodiment of the present invention with reference to the accompanying drawings.

Figure 2:
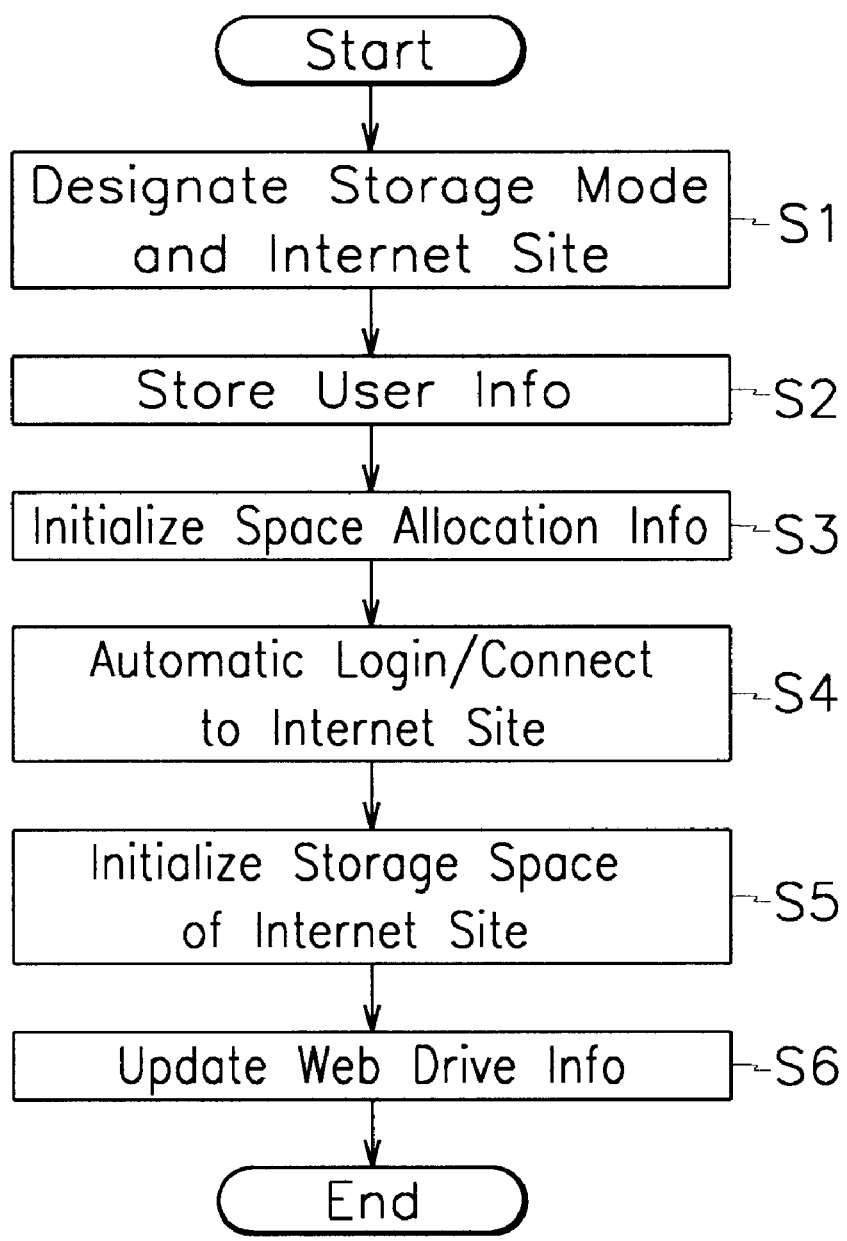
FIG. 2 is a schematic flow chart showing an initialization operation in the web drive system according to an embodiment of the present invention.

First, reference will be made to an initialization operation of the web drive system according to an embodiment of the present invention in connection with FIG. 2.

Based on the user signal received at the input 101, the mobile terminal controller 110 causes the Internet interface 200 to provide a physical connection to the Internet for the mobile terminal 100. Under a web drive connection signal for integrating storage spaces of the individual Internet sites 300 into one storage space usable in an undivided form, the mobile terminal controller 110 causes the web drive interface 120 to form an imaginary drive used as a web drive. Here, the web drive connection signal may be a user signal received at the input 101, or a programmed signal generated from the mobile terminal controller 110. The user information manager 130 sends, to the mobile terminal controller 110 via the web drive interface 120: information about the mode of storing the information data in the storage spaces of the individual Internet sites 300, i.e., single, copy, encode or compress mode; instructing information directing a user to designate a specific Internet site that provides a storage space to be used; and other instruction information directing the user to enter user information necessary to log onto the individual Internet sites 300.

The mobile terminal controller 100 causes the output 102 to display the respective information to the user. If the user inputs a user signal corresponding to the respective information to the input 101, in step 1, the user information manager 130 stores information about the designated Internet sites 300 and the user information necessary for the user to connect to the individual Internet sites 300, and causes the storage mode selector 150 to designate the mode of storing the information data in the storage spaces of the individual Internet sites 300, in step 2.

The user information manager 130 checks free space of the storage space provided by the individual Internet sites 300 from the script of Internet sites 300 designated by the user, and stores space allocation information about the storage spaces of the individual Internet sites 300 in the space allocation information storage 160, thus initializing the system, in step 3.

Subsequently, when the user information manager 130 sends to the Internet site interface 132 information about the designated Internet sites 300 and the user information necessary for the user to connect to the individual Internet sites 300, the Internet site interface 132 allows the user to automatically log onto the individual Internet sites 300 designated, based on the user information, in step 4. If the user is not registered in the designated Internet sites 300, the Internet site interface 132 automatically registers the user in the corresponding Internet sites 300 based on the user information. After the completion of the connection to the individual Internet sites 300 designated by the user, the storage space integration manager 140 initializes the storage spaces of the individual Internet sites 300, in step 5, and updates information about the web drive formed in the mobile terminal controller 110 via the web drive interface 120 to inform the user of the correct information about the web drive, in step 6. The information of the web drive may be provided in various forms, such as information about a single drive integrating all storage spaces provided by the individual Internet sites 300, information about the individual Internet sites 300 providing the web drive, or storage space capacity of the individual Internet sites 300.

Figure 3:
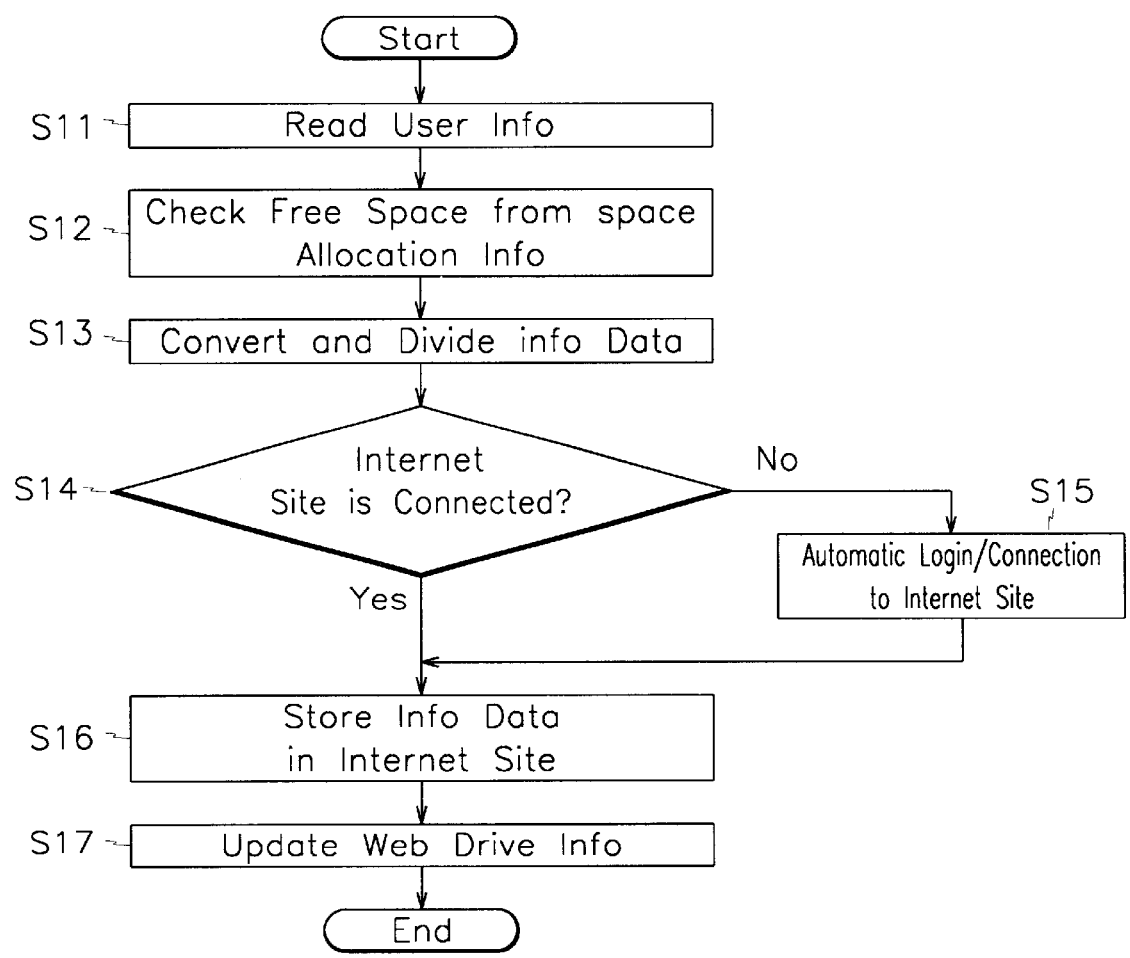
FIG. 3 is a schematic flow chart showing a write operation in the web drive system according to an embodiment of the present invention.

Now, reference will be made to a write operation of the user writing information data on the web drive initialized in the above procedures, in connection with FIG. 3.

Upon receiving a signal for storing information data in the web drive from the user via the input 101, the mobile terminal controller 110 sends an information data storage signal and information data to be stored in the web drive to the storage space integration manager 140 via the web drive interface 120. Then, the free space checker of the storage space integration manager 140 reads the user information from the user information storage 131 via the user information manager 130, in step 11, and checks the data storage capacity of the free space in the storage spaces of the individual Internet sites 300 designated based on the user information from the space allocation information stored in the space allocation information storage 160, in step 12.

Subsequently, the converter of the storage space integration manager 140 converts the information data to be stored in the storage spaces of the Internet sites 300 examined by the free space checker, and divides the information data into a plurality of files in order to equally use the free capacity of the storage spaces of the individual Internet sites 300, in step 13. The converter may not divide information data of a size small enough to be stored in the storage space of a single Internet site 300.

The storage space integration manager 140 determines in step 14 whether the user is connected via the Internet site interface 132 to the Internet site 100 that provides a storage space to be used currently. If so, the storage space integration manager 140 stores the converted and divided information data in the storage space of the corresponding Internet site 300, in step 16. Otherwise, the storage space integration manager 140 causes the user to automatically log onto the designated Internet site 300 via the Internet site interface 132 based on the user information, in step 15, and stores the information data converted and divided at the converter in the storage space of the corresponding Internet site 300, in step 16. Meanwhile, the synchronizer of the storage space integration manager 140 synchronizes a time difference between connection and data transmission to the corresponding Internet site 300, stabilizing the storage of the information data in the storage space of the Internet site 300. The storage mode selector 150 converts the information data based on the data storage mode set by the user, such as single, copy, encode or compress mode. Also, the security manager of the storage space integration manager 140 manages security in providing a connection to the individual Internet sites 300.

Subsequently, the storage space integration manager 140 stores new information, in the space allocation information storage 160, after storage of the information data in the storage spaces of the individual Internet sites 300 to update the space allocation information, which includes information about the storage capacity and the location of the individual Internet sites 300 and location information of the individual Internet sites 300 storing the information data. For example, if the information data are divided into a plurality of files, the information may include information about the individual Internet site 300 storing the respective files and the order of the files. The storage space integration manager 140 also updates information about the web drive formed in the mobile terminal controller 110 via the web drive interface 120 to inform the user of the correct information about the web drive, in step 17. The information of the web drive may be provided in various forms, such as information about a single drive integrating all storage spaces provided by the individual Internet sites 300, information about the individual Internet sites 300 providing the web drive, or storage space capacity of the individual Internet sites 300.

Figure 4:
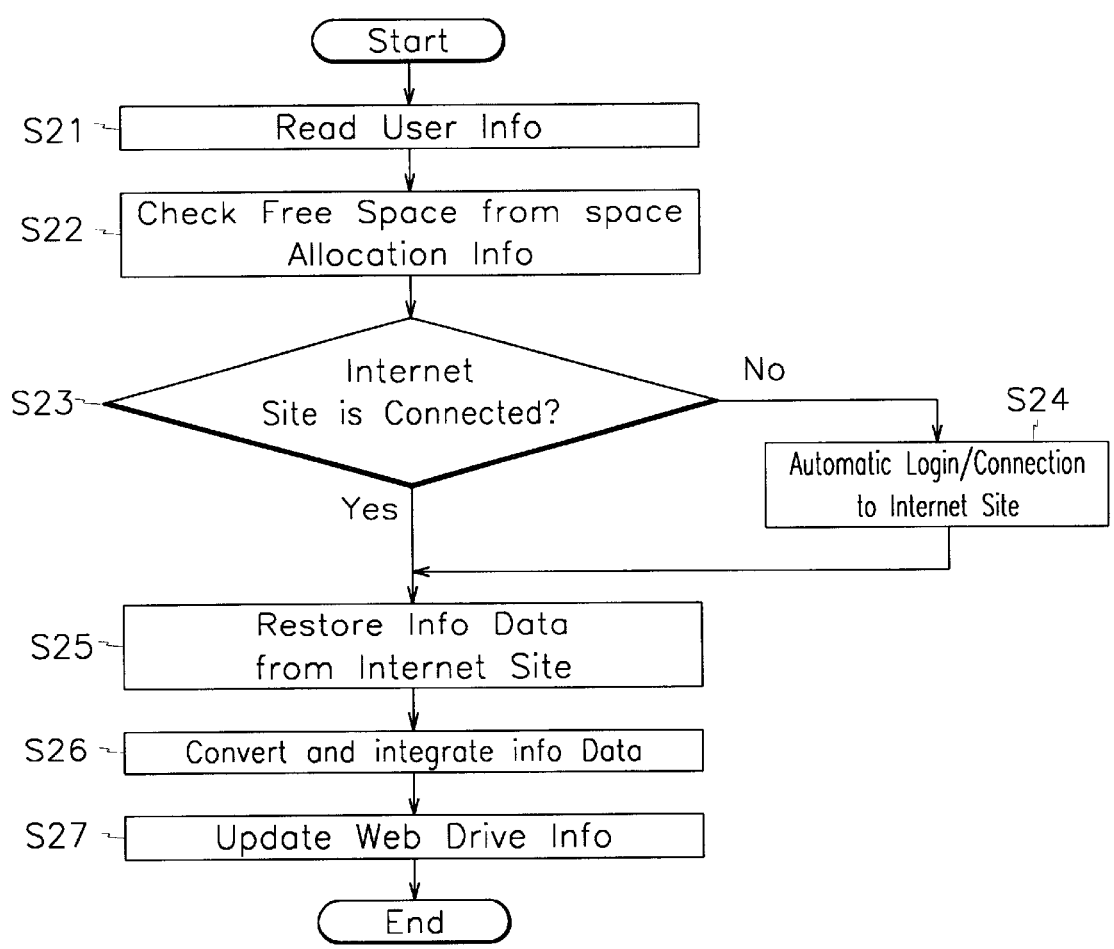
FIG. 4 is a schematic flow chart showing a read operation in the web drive system according to an embodiment of the present invention.

Now, reference will be made to a read operation of the user reading information data from the web drive initialized in connection with FIG. 4.

Upon receiving a user signal for reading information data from the storage spaces of the individual Internet sites 300 via the input 101, the mobile terminal controller 110 sends an information data read signal to the storage space integration manager 140 via the web drive interface 120. Then, the storage space integration manager 140 reads the user information from the user information storage 131 via the user information manager 130, in step 21. The storage space integration manager also locates the storage space of the individual Internet site 300 storing the information data to be read, from the space allocation information about the storage space of the individual Internet site 300 designated based on the user information stored in the space allocation information storage 160, in step 22.

The storage space integration manager 140 determines in step 23 whether the user is connected via the Internet site interface 132 to the Internet site 100 that stores the information data to be read. If so, the storage space integration manager 140 reads the information data from the storage space of the corresponding Internet site 300, in step 25. Otherwise, the storage space integration manager 140 causes the user to automatically log onto the designated Internet site 300 via the Internet site interface 132 based on the user information, in step 24, and reads the information data from the storage space of the Internet site 300, in step 25. Meanwhile, the synchronizer of the storage space integration manager 140 synchronizes connection time with data transmission time to the corresponding Internet site 300 to stabilize the read-out of the information data from the storage space of the Internet site 300. The security manager manages the security for connection to the individual Internet sites 300. The storage mode selector 150 restores the information data read from the storage space of the Internet site 300 based on the data storage mode set by the user, such as single, copy, encode or compress mode.

The converter of the storage space integration manager 140 converts the restored information in the form of data recognizable by the mobile terminal 100 and integrates the individual information data files, in step 26, so that the files are displayed to the user via the output 102 under the control of the mobile terminal controller 110.

Meanwhile, the free space checker of the storage space integration manager 140 checks the data storage capacity of the free space in the storage spaces of the individual Internet sites 300 and stores the corresponding information in the space allocation information storage 160 to update the space allocation information. The free space checker also updates information about the web drive formed in the mobile terminal controller 110 via the web drive interface 120 to inform the user of the correct information about the web drive, in step 27. The information of the web drive may be provided in various forms, such as information about a single drive integrating all storage spaces provided by the individual Internet sites 300, information about the individual Internet sites 300 providing the web drive, or storage space capacity of the individual Internet sites 300.

In addition, the above method according to the embodiment of the present invention allows a series of operations of processing information data at the drive 103 as a storage device of the mobile terminal 100, such as hard disk, memory, etc., i.e. it deletes information data stored in the storage spaces of the individual Internet sites 300.

As described above, the present invention not only integrates storage spaces of a limited capacity as provided by the individual Internet sites into one storage space that can be used like a hard disk, but also allows the user to be automatically registered in the individual Internet sites providing the storage spaces and to select capacity and stability of the storage space based on the designated mode in storing the information data.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. In a mobile terminal which includes an input for receiving a user signal to operate the mobile terminal of a user, an output for displaying the operational status of the mobile terminal, a mobile terminal controller for controlling the entire operation of the mobile terminal based on the user signal, a drive for storing various information data, and an Internet interface for providing a physical connection between the mobile terminal and the Internet, a web drive system comprising:
 a web drive interface for connecting the mobile terminal controller to an imaginary drive to form a web drive so that storage spaces provided by a plurality of Internet sites are integrated into a single drive;
 a user information manager for managing user information necessary to have access to the individual Internet sites;
 a user information storage for storing the user information;
 an Internet site interface for automatically logging onto the individual Internet sites based on the user information;
 a storage space integration manager for managing the information data to be stored/restored in/from the web drive;
 a space allocation information storage for storing space allocation information indicating the capacity of the storage space of the web drive and the location of the Internet site that stores the information data; and
 a storage mode selector for selecting the mode of storing the information data in the storage spaces of the individual Internet sites, and converting and restoring the information data based on the selected storage mode.

2. The web drive system as claimed in claim 1, wherein the storage space integration manager comprises:
 a free storage space checker for checking a free space of the storage space provided by the individual Internet sites;
 a synchronizer for synchronizing a time difference between connection and data transmission to the individual Internet sites; and
 a converter for converting, dividing and integrating the information data so as to store/read the information data in/from the storage space of the individual Internet sites.

3. The web drive system as claimed in claim 2, wherein the storage space integration manager further comprises a security manager for managing security for connection to the individual Internet sites.

4. A web drive system comprising the steps of:
 providing a connection to an imaginary drive to form a web drive upon receiving a web drive connection signal for integrating storage spaces provided by multiple Internet sites into a single storage space;
 designating a mode of storing information data in the web drive and specific Internet sites that provide the storage spaces;
 storing user information for connection to the individual Internet sites, and initializing space allocation information of the storage spaces provided by the designated Internet sites;
 automatically logging onto the designated Internet sites based on the user information stored; and
 initializing the storage spaces provided by the individual Internet sites, and updating information about the web drive.

5. The web drive system as claimed in claim 4, further comprising the steps of:
 checking the space allocation information of the storage spaces of the multiple Internet sites upon receiving an instruction signal for storing the information data in the web drive;
 converting and dividing the information data and determining whether the individual Internet sites are connected, so as to store the information data based on the space allocation information checked;

storing the converted and divided information data in the storage spaces of the individual Internet sites based on the designated storage mode if the individual Internet sites are connected, or automatically logging onto the individual Internet sites based on the user information and then storing the information data in the storage spaces of the individual Internet sites based on the designated storage mode if the individual Internet sites are not connected; and updating information about the web drive as the space allocation information of the storage spaces of the individual Internet sites changes due to changes in the stored information data.

6. The web drive system as claimed in claim 4, further comprising the steps of:

checking the space allocation information of the storage spaces of the individual Internet sites to locate the Internet sites that store the information data, upon receiving an instruction signal for reading the divided information data from the web driver;

determining whether the individual Internet sites are connected, and restoring the information data from the storage spaces of the individual Internet sites based on the designated storage mode if the individual Internet sites are connected, or automatically logging onto the individual Internet sites based on the user information and then restoring the information data from the storage spaces of the individual Internet sites based on the designated storage mode if the individual Internet sites are not connected; and converting and integrating the divided information data that is restored, and updating information about the web drive as the space allocation information of the storage spaces of the individual Internet sites changes due to changes in the restored information data.

7. The web drive system as claimed in claim 5 or 6, further comprising the step of synchronizing a time difference between connection and data transmission to the individual Internet sites in storing/restoring the information data in/from the web drive.

* * * * *